(No Model.)

A. LOEHNER.
SHAFT COUPLING.

No. 274,796. Patented Mar. 27, 1883.

Witnesses:
W. Burris
G. B. Fawles

Inventor:
August Loehner
By H. A. Daniels
Attorney

UNITED STATES PATENT OFFICE.

AUGUST LOEHNER, OF ST. LOUIS, MISSOURI, ASSIGNOR TO LOEHNER & WOLFF, OF SAME PLACE.

SHAFT-COUPLING.

SPECIFICATION forming part of Letters Patent No. 274,796, dated March 27, 1883.

Application filed March 29, 1881. (No model.)

*To all whom it may concern:*

Be it known that I, AUGUST LOEHNER, of the city of St. Louis, in the State of Missouri, have invented a new and useful Improvement in Shaft-Couplings; and I hereby declare that the following specification contains a full description of the same, reference being had to the accompanying drawings.

The object of my invention is to furnish a device with which to connect two separate shafts, forcing the ends of said shafts together and holding them firmly on the same line with certainty, accuracy, and solidity, so as to keep the shafts from swinging or becoming untrue when in operation; also, to keep the shafts from being defaced, and allow them to be rapidly disconnected when desired.

Figure 1:
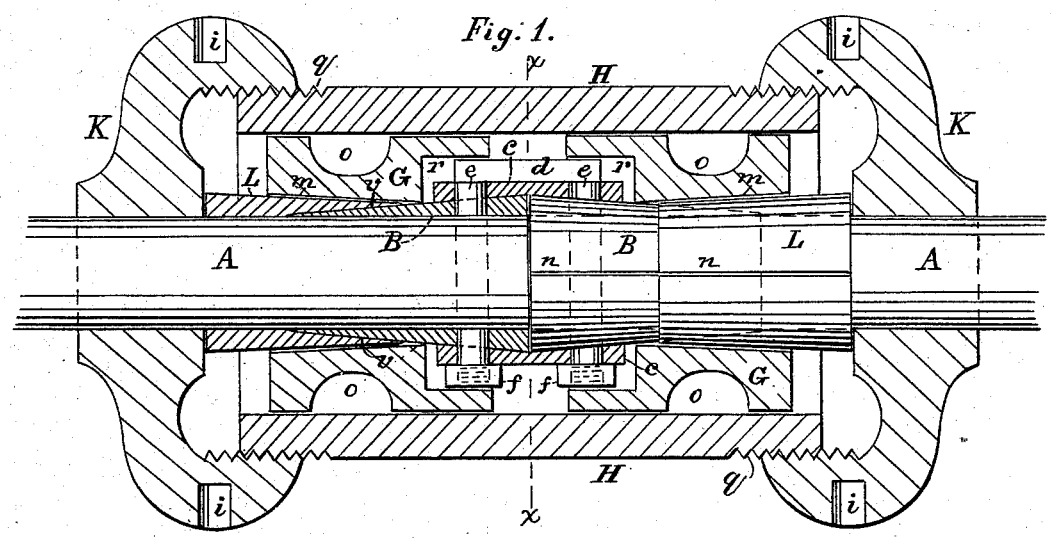
Figure 2:
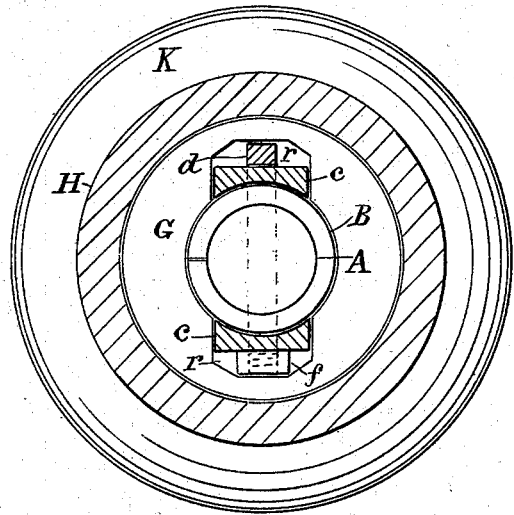
Figure 3:
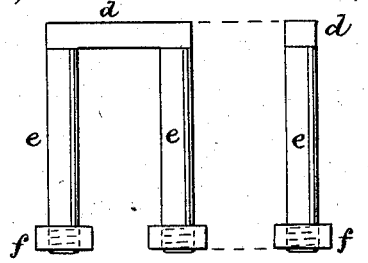
Figure 4:
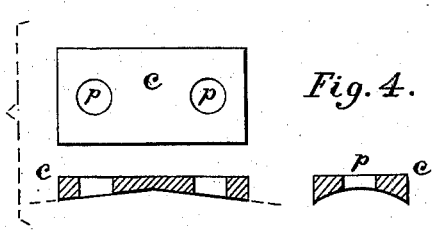

In the drawings referred to, Figure 1 is a longitudinal central section of my improved coupling. Fig. 2 is a transverse section on line $x$ $x$ of Fig. 1. Fig. 3 represents the staple used in coupling. Fig. 4 represents in plan and section a plate referred to as used in connection with the staple.

In the said drawings, A designates the two shafts to be coupled or joined together, the same being on the same horizontal line, with their ends joining.

B indicates two conical elastic wedge-rings placed on the ends of the shafts, so that the thick ends meet, the rings tapering outwardly, or from each other, to form edges, as shown. Two plates (indicated by $c$) formed on one side to fit over and against the rings B at their junction are placed thereon as shown, one plate being above and the other underneath. The said plates are perforated, the holes $p$ being intended to receive the legs $e$ of the staple $d$, and when the parts mentioned are placed in position they are secured by means of the staple $d$, the legs $e$ being passed down through the holes in the plates and corresponding holes in the rings B and the shafts A. A longitudinal opening or slit, $n$, in the side of each ring allows close compression of them to the shafts, and the staple $d$ is secured in place by the nuts $f$ on the threaded ends of the legs $e$. Thus a firm compression of the rings against the shafts is effected, the inner surfaces of the rings bearing their entire lengths against the shafts, which are rigidly connected. A further compression and bearing on the elastic rings is effected by means of the cylindrical sleeves G, which are placed on the shafts and are provided with interior grooves or recesses, $r$, to receive the projections formed by the parts above mentioned as secured to the shafts, so that the sleeves may be moved forward toward the center of connection, the recesses $r$ fitting over the projections, or may be withdrawn, as desired. As will be seen, the sleeves have a bearing immediately on the tapering rings B, which bearing is made firmer by moving the sleeves forward. For the purpose of further compression and fastening, the sleeves G have flaring recesses or seats $m$ formed inside to receive two other elastic compression-rings, L, placed on the shafts A, each of said rings tapering to an edge toward the center of the coupling, as shown. Said rings L have also the side slit, $n$, and have their inner surfaces partly inclined, so that they may, when pressed forward, extend over and bear against the wedge-rings B, as seen at $v$ in Fig. 1, and also bear against the shafts A.

H designates a hollow cylinder, which is passed over the sleeves G, fitting thereon, as shown, said cylinder having an external screw-thread, $q$, at each end to receive the threaded cap-nuts K, each of the latter having an aperture at its center, through which passes a shaft, A. The cap-nuts are forced forward on the cylinder H by means of wrench-bars inserted in the openings or recesses $i$, and when the cap-nuts are thus forced forward their inner surfaces bear against the rings L, pressing them forward over and about the rings B and within the sleeves G, the said rings L bearing against the rings B, the sleeves G, and the shafts A, and tightening the parts in position. This additional and final compression renders the whole joint and connection very firm and solid and safe in the operation of the shafts, these being held true in line, and not liable to become loose. Even should there be a difference in the diameters of the shafts, it may be supplied by placing a piece of paper or paper-board under the compression-plate. The recesses or grooves $r$ in the sleeves G, fitting over projections formed by the staple and plates, serve as guides for the sleeves in their movements, and prevent their turning. The sleeves are usually made with annular grooves

*o* for the saving of metal and on account of weight.

The loosening of the coupling parts for detachment is quite easy. The cap-nuts being unscrewed from cylinder H, the latter may be slipped off from the sleeves G. Then drive a chisel or wedge-shaped tool between the sleeves where they meet, and this will cause them to move outward, taking with them the rings L. The nuts *f* may then be removed, and the staple *d* and plate *c* may be detached, leaving the shafts free.

I claim—

1. In a shaft-coupling, the wedge-rings B, having slits *n*, in combination with a staple, *d*, and perforated plates *c*, substantially as and for the purpose described.

2. In combination with the sleeves G, having seats *m*, the tapering rings L, formed to close over and about the rings B and the shafts A, substantially as set forth.

3. In combination with the sleeves G, having recesses *r*, the staple *d*, plates *c*, and rings B, applied to shafts A, as and for the purposes described.

4. In combination with the threaded cylinder H and cap-nuts K, the compression-rings L and the rings B, substantially as shown, for the purposes described.

5. In a shaft-coupling, in combination with the rings B and L, the sleeves G and the cylinder H, having cap-nuts K, substantially as and for the purposes described.

AUGUST LOEHNER.

In presence of—
EUGENE MACBETH,
GEO. P. WOLFF.